United States Patent [19]

Coutures

[11] Patent Number: 4,543,640
[45] Date of Patent: Sep. 24, 1985

[54] ANALOG-TO-DIGITAL CORRELATOR WITH PROGRAMMABLE COEFFICIENTS WITH VALUES OF +1, −1 OR 0

[75] Inventor: Jean-Louis Coutures, Paris, France

[73] Assignee: Thomson-CSF, Paris, France

[21] Appl. No.: 424,745

[22] Filed: Sep. 27, 1982

[30] Foreign Application Priority Data

Apr. 20, 1982 [FR] France ................. 82 06756

[51] Int. Cl.$^4$ .............. G06J 1/00; G06G 7/19
[52] U.S. Cl. .................. 364/604; 364/824; 364/862
[58] Field of Search ............ 364/604, 824, 825, 862

[56] References Cited

U.S. PATENT DOCUMENTS

| 4,120,035 | 10/1978 | Cases et al. | 364/862 X |
| 4,295,204 | 10/1981 | Sunstein | 364/824 |
| 4,298,953 | 11/1981 | Monroe | 364/824 X |
| 4,316,258 | 2/1982 | Berger | 364/862 X |
| 4,403,299 | 9/1983 | Engeler | 364/824 |
| 4,414,641 | 11/1983 | Jarrett | 364/604 |

OTHER PUBLICATIONS

RETICON-R5403 Analog-Analog Correlator Couvolver, Reticon Corporation 1979 Publication.
The Radio and Electronic Engineer, vol. 50, No. 5, May 1980 (London, GB) J. Mavor et al., "A Monolithic CCD . . . ".
IEEE Transactions on Electron Devices, vol. ED-26, No. 4, Apr. 1979 (New York, US) D. Gandolfo et al. "Analog-Binary".
IEEE Transactions on Solid State Circuits, vol. SC-17, Feb. 1982 (New York, US) R. Miller "A Merged Pipe Organ".
IEEE Transactions on Electron Devices, vol. ED-26, No. 2, Feb. 1979 (New York, US) E. Herrmann et al.

Primary Examiner—Felix D. Gruber
Attorney, Agent, or Firm—Roland Plottel

[57] ABSTRACT

This invention concerns an analog-to-digital correlator with programmable coefficients with values of +1, −1 or 0.

This correlator comprises a charge-transfer shift register to receive samples of the analog input signal for correlation, and two programmable digital-output shift registers, followed by memories to establish coefficients with values of +1, −1 or 0. Depending on the signal available at the digital register outputs:
reading of charges is blocked on the analog register, corresponding to establishment of coefficient 0;
reading of charges occurs, reaching either the positive or the negative input of a differential amplifier, corresponding to the establishment of coefficient +1 or −1.

8 Claims, 11 Drawing Figures

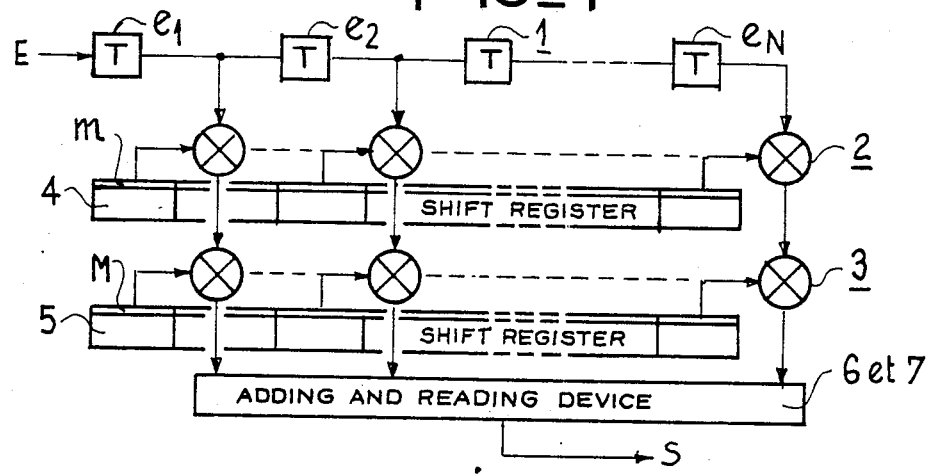
FIG_1
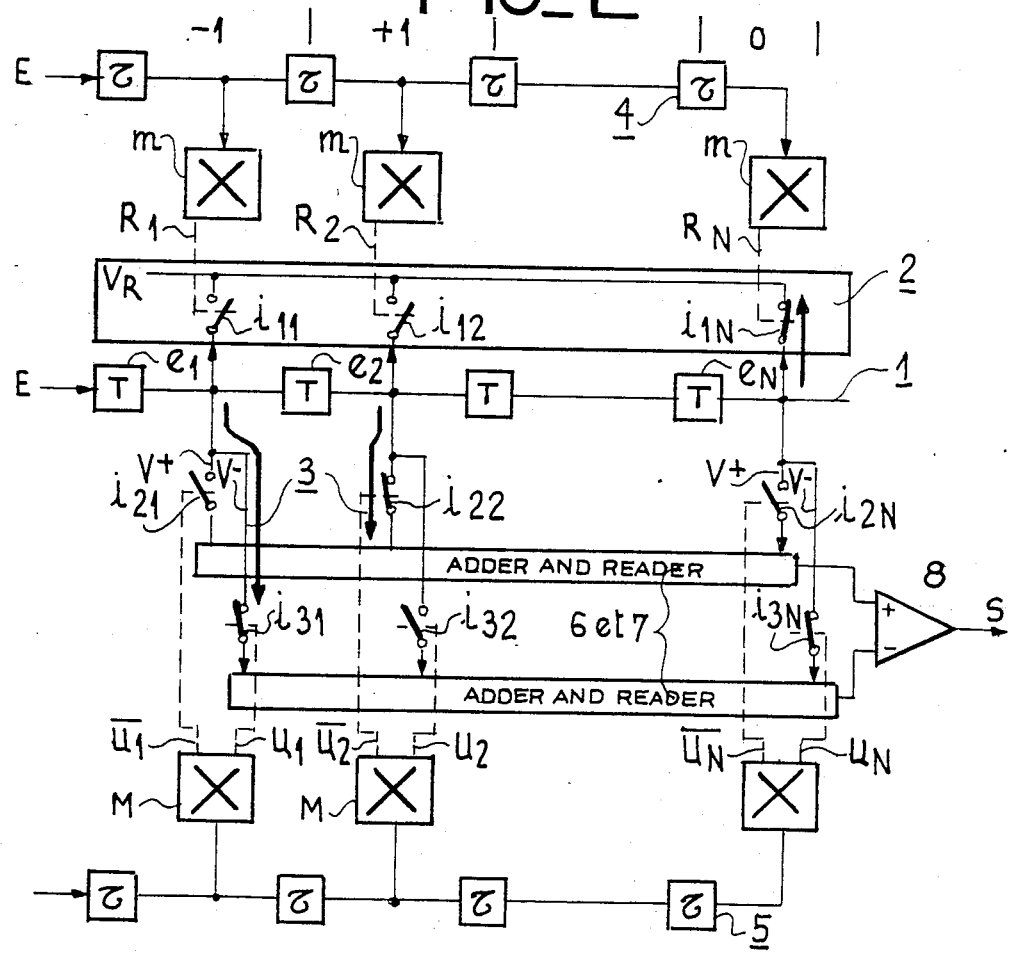
FIG_2

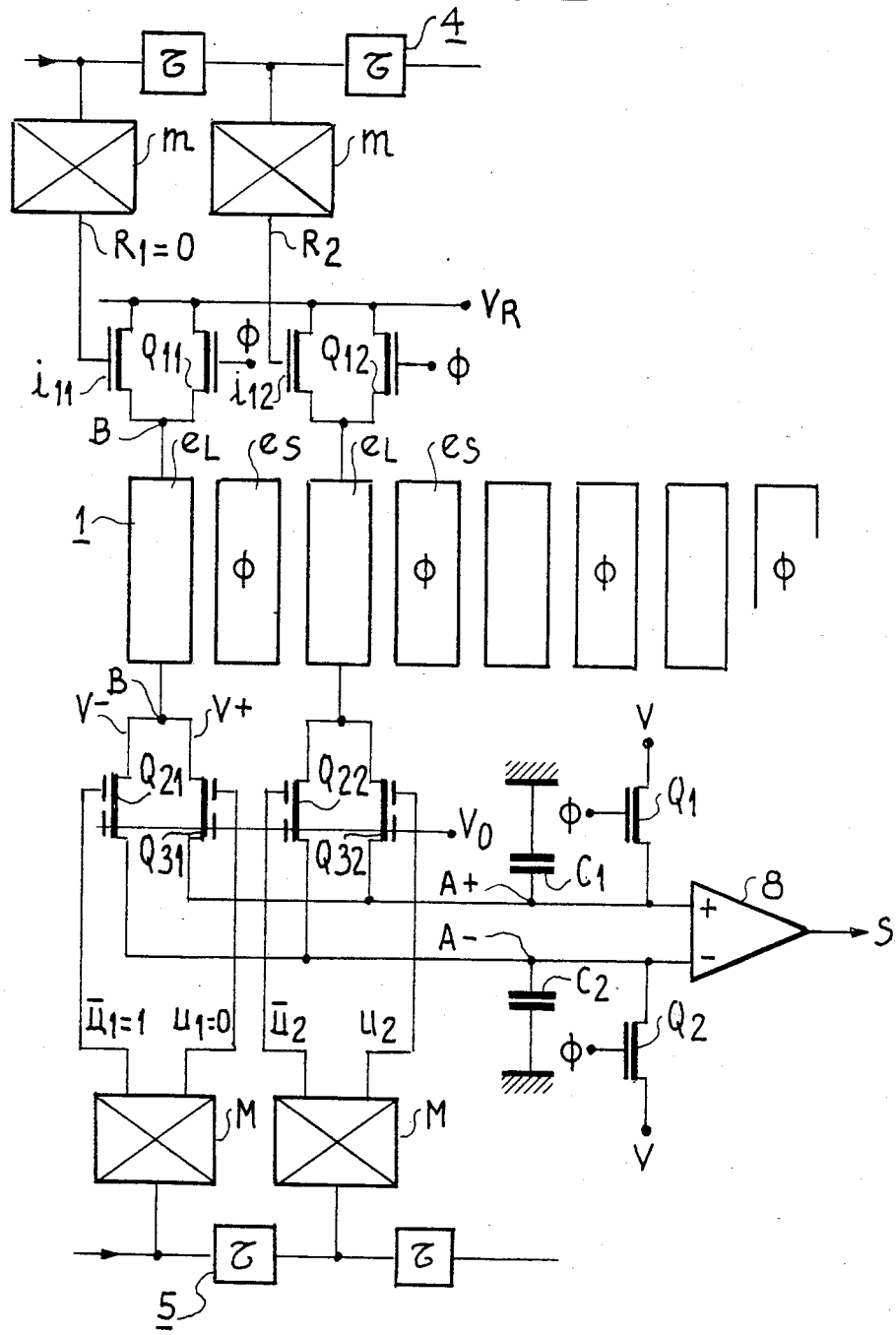

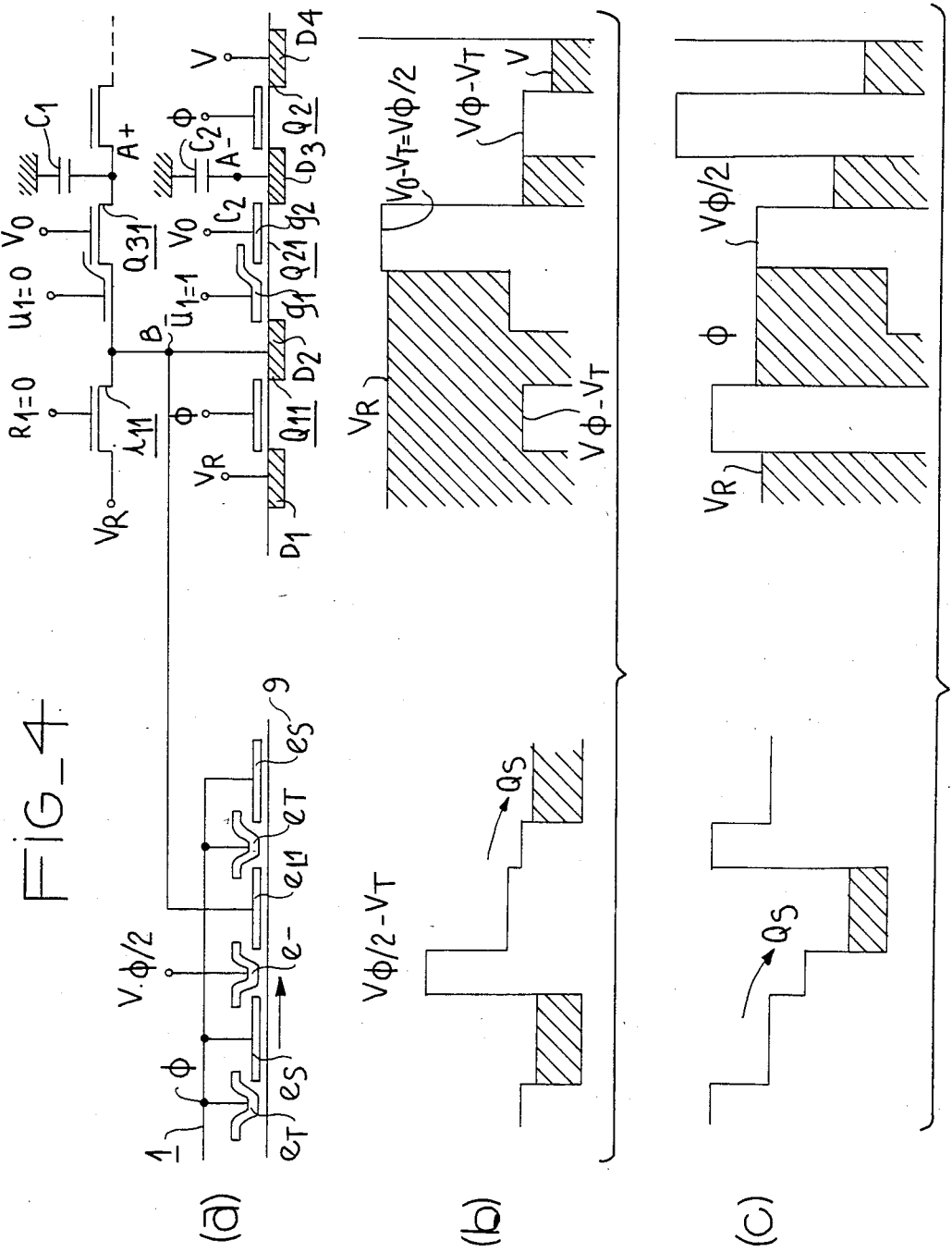

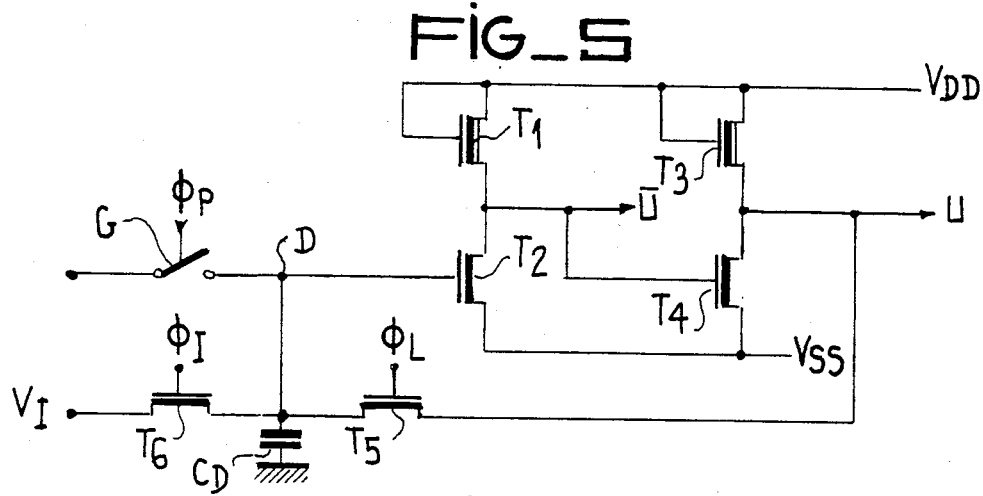
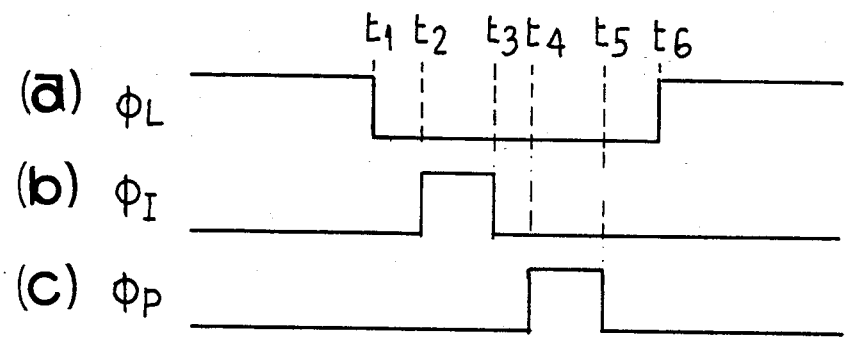
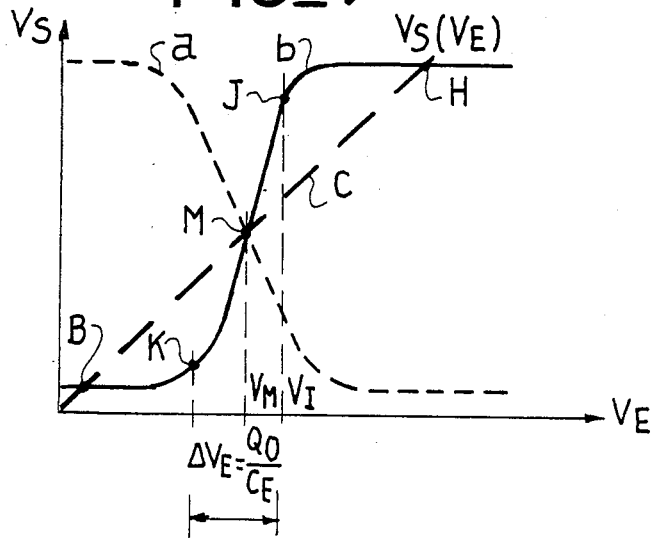

ANALOG-TO-DIGITAL CORRELATOR WITH PROGRAMMABLE COEFFICIENTS WITH VALUES OF +1, −1 OR 0

CROSS-REFERENCE:

This application incorporates by reference material from U.S. Pat. Nos. 4,264,964 and 4,398,099, assigned to the assignee of the present application.

BACKGROUND OF THE INVENTION

This invention concerns an analog-to-digital correlator with programmable correlation coefficients with values of +1, −1 or 0.

Such correlators have many uses, for adapted filtering, process identification or signal processing, in different fields, such as radar, sonar, communications, or data processing.

SUMMARY OF THE INVENTION

The correlator proposed in this invention comprises:
a charge-transfer shift register to receive samples of the input analog signal for correlation;
means for cancelling the signal at the output from each stage of the charge-transfer register;
means for multiplying by +1 or −1 the output signal from each stage of the charge-transfer register not cancelled by the cancelling device;
two shift registers with programmable digital outputs, with values of 0 or 1, one controlling the cancelling device and the other controlling the multiplier, through memories connected to each output of these two registers;
means of algebraic adding of the multiplier output signals, and means of reading charges, so as to obtain an electric output signal from the correlator.

BRIEF FIGURE DESCRIPTION

Other features, purposes and results of the invention will emerge from the following description of one of the possible embodiments, with reference to the accompanying figures:

FIGS. 1 and 2, schematic diagrams of two embodiments of the novel correlator;

FIG. 3, showing one embodiment of the novel correlator;

FIG. 4a, b et c, showing explanatory diagrams of the correlator represented in FIG. 3;

FIG. 5, showing a memory used in the novel correlator;

FIG. 6a, b et c, showing clock signals delivered to the memory of FIG. 5;

FIG. 7, showing curves to illustrate functioning of the memory of FIG. 5.

DETAILED DESCRIPTION

In these figures, the same references are used for the similar components, although, for greater clarity, the dimensions and proportions of the various components are not respected.

FIG. 1 is a schematic diagram illustrating the general principle of the correlator according to this invention.

This correlator comprises a charge-transfer shift register 1, which receives samples of the input analog signal E to be correlated. Each sample is transferred from one stage of the register to the next, with a delay T. Stages $e_1$ to $e_N$ are represented by squares marked with a T.

The output from each stage of the analog register 1 is connected to means 2 of cancelling the output signal from that stage, represented by circles marked with an X, and controlled by a shift register 4 with programmable digital outputs, with values of 0 or +1, through memories m. Each output signal from this digital-output register 4 passes to a memory m and control one of the cancellation devices 2.

Depending on whether the signal from the digital-output register 4 is 0 or 1, the output signal E(t-kT) from stage $e_k$ of the register 1 is multiplied by a coefficient $(h_a)k$ with a value of 0 or +1.

As shown in FIG. 1, signals from cancellation device 2 then enter means 3, also represented by circles marked with an X, which multiply by +1 or −1 the output signal from any stage of the analog register not cancelled by the cancellation device 2.

Like the cancellation device, the +1 or −1 multiplier is controlled by a shift register 5 with programmable digital outputs, with values of 0 or +1, through memories M. Each output signal from this digital-output register 5 passes to a memory M and controls one of the multipliers 3.

Consequently, depending on the signal from digital-output register 5, the output signal E(t-kT) from stage $e_k$ of the register, which is already multiplied by the coefficient $(h_a)k$, is further multiplied by a coefficient $(h_m)k$, with a value of +1 or −1.

Multiplier output signals then enter the algebraic adding device 6 and reading device 7, in order to obtain an electric output signal S from the correlator, which can be expressed as follows:

$$S = \sum_{k=0}^{N} (h_a)k \times (h_m)k \times E(t - kT)$$

where k is the rank of the stage of the coefficient.

In other words this invention makes it possible to correlate a sample input analog signal E with programmable coefficients of +1, −1 or 0.

It is a simple matter to modify the signal, in the form of 0 or 1, transferred to the inputs of the digital-output registers 4 and 5, and stored in the memories m and M. It is therefore possible for a given stage $e_k$ of the analog register 1 to give the coefficient $(h_a)k$ the value 0 or 1, and the coefficient $(h_m)k$ the value +1 or −1. The product $(h_a)k \times (h_m)k$ can thus have the value +1, −1 or 0.

FIG. 2 shows the principles of the correlator, in greater detail.

The analog register 1 is in the middle, and the digital-output shift registers 4 and 5 at the top and bottom, represented by a series of squares for the different stages, and marked with a τ (the time needed to transfer data from one stage to the next).

Cancellation device 2 is formed of a number of electronic switches $i_{11}$ to $i_{1N}$, connected between the output from each stage of analog register 1 and a reference potential $V_R$. These switches are controlled by signals $R_1$ to $R_N$ from the memories m connected to the output from each stage of the digital-output register 4, control of these switches by the memory outputs being represented by broken lines.

Depending on the memory output signals, switches $i_{11}$ to $i_{1N}$ are open or closed.

The right hand side of FIG. 2 shows switch $i_{1N}$ of stage $e_N$ of the analog register 1 in the closed state. Reading of charges at the output from stage $e_N$ is blocked, because of application of the reference potential $V_R$ to this output. The coefficient $(h_a)N$ equals 0. A thick arrow shows the path of charges from this output $e_N$ to the reference potential. At stage $e_N$, correlation occurs between the output from this stage and the coefficient 0, as shown at the top of FIG. 2.

The multiplier by $+1$ or $-1$ is formed of two parallel charge-reading tracks ($V^+$ and $V^-$). These two tracks are connected to the output from each stage of analog register 1. Each track comprises at least one switch, $V^+$ tracks comprising switches $i_{21}$ to $i_{2N}$, and $V^-$ tracks switches $i_{31}$ to $i_{3N}$. Each switch is connected between the output from a stage of analog register 1, and algebraic adder 6 and 7, represented by rectangles, and connected to the positive input of a differential amplifier 8, if the switch in question is part of a $V^+$ track, or to the negative input, if the switch in question is part of a $V^-$ track.

The differential amplifier may be an operational amplifier or a differential amplifier with switched capacitors, as described in French patent application No. 78 27505, filed on behalf of THOMSON-CSF, on Sept. 26, 1978 and the corresponding U.S. Pat. No. 4,398,099.

Switches $i_{21}$ to $i_{2N}$ and $i_{31}$ to $i_{3N}$ are operated by memories M at outputs from the stages of the digital-output register 5.

FIG. 2 shows that each memory M possesses two complementary outputs $U_1$ and $\overline{U_1}$ to $U_N$ and $\overline{U_N}$.

For each memory, one of the outputs controls the $V^+$ track switch, and the other the $V^-$ track switch.

The left-hand side of FIG. 2 shows switch $i_{21}$ of stage $e_1$ in the open state, and switch $i_{31}$ of the same stage in the closed state. The coefficient $(h_m)1$ equals $-1$. The cancellation device switch $i_{11}$ is open, so reading of charges from the output of the first stage $e_1$ is possible, and the coefficient $(h_a)1$ equals 1. The thick arrow shows charges from the first stage output passing through switch $i_{31}$, from which they reach the negative input of differential amplifier 8. The output signal from stage $e_1$ is correlated with a coefficient of $-1$, as shown at the top of FIG. 2.

Switches $i_{12}$ and $i_{32}$ of stage $e_2$ are shown open, and switch $i_{22}$, which is connected to the positive input of the differential amplifier, is closed. The output signal from stage $e_2$ is thus correlated with a coefficient of $+1$.

This correlator offers the advantage of requiring only two digital-output registers to issue three sorts of coefficients: $+1$, $-1$ and 0.

FIG. 3 shows one embodiment of the invention, and FIG. 4a, b and c are explanatory diagrams of how the correlator in FIG. 3 operates.

In this embodiment, analog register 1 operates on single-phase current. The left-hand side of FIG. 4a shows this register in longitudinal section, in the direction of transfer of charges shown by an arrow. It comprises pairs of electrodes, formed of a transfer electrode $e_T$, and a storage electrode $e_S$. Each stage of the register comprises two pairs of electrodes, one of which receives a clock signal $\phi$ oscillating between a low level and a high level $V_\phi$, while the storage electrode of the other pair is the reading electrode, used to read charges issuing from the stage, and therefore connected to the charge-reading device, while the transfer electrode in the same pair is connected to a reference voltage, often selected to equal $V_\phi/2$.

In FIG. 4a, transfer and storage electrodes are coplanar. One-way transfer of charges is therefore effected by implanting impurities in the semiconductor substrate 9, although it could also be obtained by using extra thicknesses of oxide.

FIG. 3 shows a plan view of analog register 1. For greater clarity, the transfer electrodes are not included, only the storage electrodes $e_S$ receiving the clock signal $\phi$, and marked with the symbol $\phi$, and reading electrodes $e_L$.

FIGS. 4b and 4c are diagrams representing the development of channel potentials in the semiconductor substrate 9. The presence of minority carriers is shown by hatched regions.

The left-hand side of FIG. 4b shows that when the clock signal $\phi$ is at high level, the quantities of charges for reading $Q_S$ are beneath storage electrodes, while the left-hand side of FIG. 4c shows that when the clock signal $\phi$ changes to low level, a quantity of charges $Q_S$ arrives beneath reading electrode $e_{L1}$. Channel potential beneath the pair of electrodes connected to $V_\phi/2$ and to the reading device hardly changes when $\phi$ moves from high level to low level, or vice versa.

FIG. 3 shows the digital-output registers 4 and 5, and accompanying memories m and M. Analog register reading electrodes $e_L$ are connected to four MOS transistors:

$i_{11}$ to $i_{1N}$, which form the electronic switches of the cancelling device; they are connected by their drain and source between a reading electrode and the reference potential $V_R$, while their gate is controlled by output signals $R_1$ to $R_N$ of memories m; throughout, the type of MOS transistors (depletion or enrichment transistors) and their polarization are chosen so that, for example, when the memory output signal is at logic level 1, the transistors are conducting, and so that they are blocked inversely when the output signal is at logic level 0;

$Q_{11}$ to $Q_{1N}$, connected by their drain and source between a reading electrode and the reference potential $V_R$, controlled by the clock signal $\phi$ applied to their gate, and forming part of the reading device;

$Q_{21}$ to $Q_{2N}$ on $V^+$ tracks and $Q_{31}$ to $Q_{3N}$ on $V^-$ tracks, forming switches $i_{21}$ to $i_{2N}$ and $i_{31}$ to $i_{3N}$ of the multipliers, and connected by their drain and source between a reading electrode and either the positive or the negative input of differential amplifier 8, common to the whole correlator; one of the gates of these transistors is controlled by signals from memories M; in the embodiment in FIG. 3, transistors $Q_{21}$ to $Q_{2N}$ and $Q_{31}$ to $Q_{3N}$ are double-gate MOS transistors; instead of a double-base MOS transistor, two MOS transistors can be connected in series, one forming part of the multiplier and controlled by the outputs from memories M, and the other forming part of the reading device and controlled by a reference potential $V_O$; in the embodiment in FIG. 3, it is the second gate of transistors $Q_{21}$ to $Q_{2N}$ and $Q_{31}$ to $Q_{3N}$ that receives the reference potential $V_O$.

FIG. 3 shows that the positive input (point $A^+$) and negative input (point $A^-$) of the differential amplifier are connected to capacitors $C_1$ and $C_2$, also connected to earth, and to MOS transistors $Q_1$ and $Q_2$, which are connected by their drain and source between points $A^+$ and $A^-$ and a reference potential V. The gates of these transistors receive the clock signal $\phi$. Capacitors $C_1$ and $C_2$ and transistors $Q_1$ and $Q_2$ form part of the correlator reading device. It would of course be possible to use another control circuit performing the same function as these transistors.

Operation of the correlator illustrated in FIG. 3 whill now be described, with particular reference to the right-hand side of FIGS. 4b and c, showing the development of surface potentials in the semiconductor substrate of transistors $Q_{11}$, $Q_{21}$ and $Q_2$.

Reading electrode $e_{L1}$ of stage $e_1$, taken as an example, is connected at point B to transistors $Q_{11}$, $Q_{21}$, $i_{11}$ and $Q_{31}$. Only $Q_{11}$ and $Q_{21}$ are shown in lengthwise section in FIG. 4a.

FIG. 4b shows surface potentials in the substrate at a time when the clock signal $\phi$ is at high level.

The left-hand side of FIG. 4b shows that quantities of signal charges $Q_S$ are beneath the storage electrodes connected to $\phi$.

The right-hand side of FIG. 4b shows that diode $D_1$ of transistor $Q_{11}$, connected to $V_R$, imposes this potential beneath the gate of transistor $Q_{11}$ and beneath diode $D_2$, connected to point B and common to transistors $Q_{11}$, $Q_{21}$, $i_{11}$ and $Q_{31}$. This potential is also imposed beneath one of the gates $G_1$ of transistor $Q_{21}$, which is connected to output $\overline{U}_1$ of a memory M. This output is in state 1, and a high level is imposed on the gate of $Q_{21}$. Transistor $Q_{31}$, one of the gates of which is controlled by output $U_1$ in state O, is blocked. Similarly, transistor $i_{11}$ is controlled by output $R_1$ in state O from a memory m, and is therefore blocked.

The other gate $G_2$ of the double-gate MOS transistor $Q_{21}$ receives the reference potential $V_O$. Channel potential beneath this gate equals $V_O - V_T$, where $V_T$ is the threshold voltage of transistor $Q_{21}$. $V_O - V_T$ should be very slightly less than $V_R$, so that point B is isolated from the right-hand part of the reading device, while the clock signal is at high level.

The reference potential $V_O$ may be chosen so that $V_R \approx V_O - V_T = V_\phi/2$.

The potential applied to the two electrodes of the transfer/reading pair is approximately the same.

The clock signal $\phi$ is applied to the gate of transistor $Q_2$, diode $D_4$ of which receives the potential V, while diode $D_3$ is connected at point $A^-$ to capacitor $C_2$. In FIG. 4, V exceeds $V_\phi - V_T$, so that transistor $Q_2$ is saturated. Capacitor $C_2$ is charged to the level $C_2(V_\phi - V_T)$. This transistor $Q_2$ could also function as a triode.

The potential $V_\phi - V_T$ of diode $D_3$ is much higher than the potential $V_\phi/2$ of gates $G_1$ and $G_2$ of $Q_{21}$, and of diode $D_2$. Transistor $Q_{21}$ is then saturation polarized.

FIG. 4c shows channel potentials in the substrate, when the clock signal $\phi$ is at low level.

The left-hand side of the figure shows that the quantity of charges for reading $Q_S$ arrives beneath reading electrode $e_{L1}$.

The gate of $Q_{11}$ receives the low-level clock signal, and isolates diode $D_1$, connected to $V_R$, from the rest of the reading device. Transistor $Q_{21}$ remains saturation polarized. The quantity of charges $Q_S$ arriving beneath reading electrode $e_{L1}$ in the left-hand part of FIG. 4c causes a reduction in surface potential at point B, where it is immediately re-established to $V_\phi/2 = V_O - V_T$ by base $G_2$. A quantity of charges $Q_S$ is transmitted to point $A^-$, and discharges capacitor $C_2$, since passage of $\phi$ to the low-level clock signal has blocked transistor $Q_2$.

The negative input to the differential amplifier is connected to capacitor $C_2$, the charge of which has been modified by the arrival of a quantity of charges $Q_S$ beneath reading electrode $e_{L1}$. This achieves reading of these charges and, in the example illustrated here, correlation with coefficient $-1$.

When the quantity of charges $Q_S$ reaches point B, transistor $Q_{11}$ must already be blocked. Charge transfer to electrode $e_{L1}$ takes place only when the clock signal has fallen to $V_\phi/2$. Transistor $Q_{11}$ blocks at $\phi - V_T = V_\phi/2$ and $\phi = V_\phi/2 + V_T$, where $V_T$ is its threshold voltage. Consequently, transistor $Q_{11}$ blocks at $\phi = V_\phi/2 + V_T$, and it is only when $\phi$ equals $V_\phi/2$ that charges arrive beneath $e_{L1}$.

More generally, the various reference voltages, $Q_{11}$ threshold voltage, and the clock signal amplitude must be chosen so that $Q_S$ will reach point B while transistor $Q_{11}$ is blocked.

Continuing with the example of reading electrode $e_{L1}$, it may be seen that for correlation by coefficient $+1$ to occur, $\overline{U}_1$ must equal 0 and $U_1$ equal 1 at the output from memory M, retaining $R_1 = 0$ at the output from memory m. In this case, $Q_{21}$ is blocked and the quantity of charges $Q_S$ passes through transistor $Q_{31}$, connected to the positive input of the differential amplifier.

For correlation with coefficient O to occur, $R_1$ must equal 1 at the output from memory m. In this case, transistor $i_{11}$ is conducting, whether the clock signal $\phi$ is high or low. The potential $V_R$, to which $i_{11}$ is connected, is imposed permanently at point B, whereupon charge reading is blocked. When the quantity of charges $Q_S$ arrives beneath electrode $e_{L1}$, there is no further potential variation at point B, which has a fixed potential. No reading of $Q_S$ takes place. The charge of capacitors $C_1$ and $C_2$ does not vary. Correlation with coefficient O occurs.

Naturally, the correlator proposed in this invention may also comprise an analog register with not single-phase, but two-phase or three-phase functioning, for example.

Single-phase functioning has the advantage of reducing the number of clock signals, and of allowing high-frequency operation.

Analog register 1 may have two-phase functioning, with two clock signals $\phi_1$ and $\phi_2$ in opposite phases, overlapping at high lever. Signal $\phi_1$ is applied to the transfer/storage electrode pairs, and $\phi_2$ to the transfer electrodes forming part of the transfer/reading pairs. A clock signal $\phi_3$, the phase of which is delayed in relation to $\phi_1$, is then applied to gate $G_2$ of $Q_{21}$. Diode $D_1$ of $Q_{11}$ is connected to earth, and the gate of $Q_{11}$ receives a clock signal $\phi_{RAZ}$, which is at high level between the time when $\phi_2$ changes to low level and the time when $\phi_3$ changes to high level.

Digital-output registers 4 and 5 may be MOS transistors, or charge-transfer registers in which absense of charges represents O and their presence 1, for example. In this case, memories m and M may be formed of a charge-transfer device, as described in patent application No. 78 26552, filed on behalf of THOMSON-CSF on Sept. 15, 1978 and corresponding U.S. Pat. No. 4,264,964. For memories M, a reverser is used, in order to have additional outputs, though this may also be a charge-transfer device.

FIG. 5 shows the diagram of a memory that could be used in this correlator. This memory offers the advantage of having two additional outputs U and $\overline{U}$.

This memory comprises two inverters, mounted in series, each formed of two MOS transistors in series, connected to two reference voltages $V_{DD}$ and $V_{SS}$.

MOS transistors $T_1$ and $T_3$ connected to $V_{DD}$ are depletion transistors, the gate of which is also connected to $V_{DD}$, while $T_2$ and $T_4$, connected to $V_{SS}$, are enrichment transistors. Input D of the first inverter leads to the gate of $T_2$, and its output U to the point common to $T_1$ and $T_2$. This output is connected to the gate of $T_4$, and the output U of the two reversers in series leads to the point common to $T_3$ and $T_4$.

Another enrichment MOS transistor $T_5$ is connected by its drain and source between input D and output U of the two reversers in series. Its base is controlled by a clock signal $\phi_L$.

Point D is also connected to:
- a capacitor $C_D$ between point D and earth;
- an enrichment MOS transistor $T_6$, also connected to a reference potential $V_1$, and the gate of which is controlled by a clock signal $\phi_I$;
- a gate G connected to the output of a stage of one of the digital-output registers 4 and 5, and controlled by a clock signal $\phi_p$; this gate is represented by a switch.

FIG. 7 shows, in a broken line, the response curve a, for output voltage in relation to input voltage, for each reverser. The figure also shows, in a continuous line, the response curve b of the two inverters connected in series, and, in a broken line with wider spaces, the bisectrix c, at which $V_S = V_E$. Curves a and b each show two stable states separated by a transition zone.

For the memory to function properly, curve b must have a gain of more than 1 in the transition zone, in other words intersect the bisectrix c at three points. One of these points M is located in the transition zone, and the two others B and H in the low-level and high-level stable states.

This condition may also be expressed as follows. If $L_1$ is the channel length of $T_2$ and $T_4$ (i.e. the distance between the two diffusions forming the drain and the source of these transitors), $L_2$ is the length and $W_2$ the channel width of $T_1$ and $T_3$, $B_1$ is the ratio $W_1/L_1$, and $B_2$ is the ratio $W_2/L_2$, then $B_1$ must be much greater than $B_2$.

The bisectrix c divides curve b into two zones:
- a first zone in which $V_S$ is greater than $V_E$, i.e. where $(V_S/V_E) - 1$ is positive, and
- a second, where $V_S$ is less than $V_E$, i.e. where $(V_S/V_E) - 1$ is negative.

FIGS. 6a, b and c, showing clock signals $\phi_L$, $\phi_I$ and $\phi_p$, illustrate how this memory functions.

Clock signals intervene only to memorize new digital data. After time $t_6$, $\phi_L$ is at high level, and $\phi_I$ and $\phi_p$ are at low level. Six successive times $t_1$ to $t_6$ are shown. From $t_1$ to $t_6$, $\phi_L$ is at low level, while $\phi_I$ is at high level from $t_2$ to $t_3$, and $\phi_p$ from $t_4$ to $t_5$.

At $t_1$, the change of $\phi_L$ to low level blocks transistor $t_5$. Input D is disconnected from output U.

At $t_2$, the change of $\phi_I$ to high level makes $t_6$ conducting, and charges capacitor $C_D$ to potential $V_I$.

This potential $V_I$ must be such that the functioning point on curve b is in the zone where $V_S$ is greater than $V_E$, or in the zone where $V_S$ is less than $V_E$, depending on whether loads to be detected are electrons or holes.

FIG. 7 illustrates the case in which charges to be detected are electrons. The functioning point J is situated in the zone of curve b where $V_S$ is greater than $V_E$, i.e. in the zone above the curve c.

At $t_3$, $\phi_I$ changes to low level and the potential of capacitor $C_D$ becomes floating.

At $t_4$, $\phi_P$ changes to high level. The charge is admitted to the input of memories m or M.

If this stage contains a quantity of charges $Q_O$, the charge in capacitor $C_D$ will drop, because of the arrival of this quantity of charges at point D.

The functioning point on curve b moves from J to K, where $V_S$ is less than $V_E$.

If this stage contains no quantity of charges, the charge in $C_D$ will remain unchanged, and the functioning point stays at J.

At $t_5$, $\phi_p$ changes to low level.

At $t_o$, $\phi_L$, changes to high level. Transistor $T_5$ is conducting, and connects input D with output U.

Since output U has low impedance and input D high impedance, the output imposes its potential on the input.

Accordingly, if the functioning point is at K, where $V_S$ is less than $V_E$, $V_E$ tends to fall after $t_6$. The functioning point moves, stabilizing at point B, since the functioning point is then necessarily situated on the bisectrix c.

If the functioning point is J, where $V_S$ is greater than $V_E$, $V_E$ tends to rise, and the functioning point moves to H.

Depending on whether or not the stage of the digital output registers 4 or 5 in FIG. 2 contains a quantity of charges $Q_O$, the memory delivers two quite different amplitude voltages at output U, corresponding to state 0 or state 1.

The additional result is available at output U.

Capacitor $C_D$ may be formed merely of the stray capacitances between drain and source of transistors $T_5$ and $T_6$, connected to point D.

The invention is not limited to the embodiments shown and described herein; many modifications and variantes may be envisaged by those skilled in the art, without departing from the spirit and scope of the invention as defined in the appended claims.

What is claimed is

1. An analog-to-digital correlator, with programmable correlation coefficients with values of +1, −1, or 0, which comprises:
   a multi-stage analog charge-transfer shift register (1) receiving samples of an input analog signal (E) for correlation, each stage (e) thereof including at least one reading electrode;
   means (2) for multiplying by +1 or 0 the signal at the output from each stage (e) of the charge-transfer register;
   means (3) for multiplying by +1 or −1 the output signal, from each stage of the charge-transfer register, not cancelled by said means for multiplying by +1 or 0,
   said means (3) for multiplying by +1 or −1 comprising two parallel charge-reading tracks, one of said tracks being connected to the positive input of said differential amplifier, and the other of said tracks being connected to the negative input of said amplifier,;
   two shift registers (4, 5) with programmable digital outputs with values of 0 or 1, the respective outputs of the two shift registers being connected to two memories (m, M),
   one (m) of said memories controlling said means (2) for multiplying by +1 or 0, and the other (M) of said memories controlling said means (3) of multiplying by +1 or −1, said digital-output registers (4, 5) selectively controlling outputs of said charge-reading tracks to one of two conditions, reading or blocking of reading;

a differential amplifier (8) having a positive input and a negative input;

means (6) for algebraic adding of output signals of said respective means for multiplying, and means (7) for reading charges, so as to obtain an electric output signal (S) from the correlator, said means for reading charges comprising:

a first group of metal-oxide-semiconductor (MOS) transistors connected, on each reading track, on the one hand, to the reading electrode of each stage (e) of the analog register (1), and, on the other hand, to one of said inputs of said differential amplifier (8);

a pair of capacitors, each being connected between ground and a respective input of said differential amplifier (8);

a control circuit connected to each differential amplifier input, responsible for charging said capacitor and for saturation of said first group of MOS transistors, before arrival of charges to be read beneath the reading electrodes, the capacitor potential being left floating during arrival of charges;

a second group of MOS transistors connected between the reading electrode of each stage of said analog register and a reference potential, said transistors blocking reading during intervals when quantities of charge for reading are not beneath the reading electrodes;

said (2) means for multiplying by +1 or 0 comprising:

a third group of MOS transistors, connected by their collectors and sources between the reading electrode of each stage of the charge-transfer shift register and the reference potential, said transistor being controlled by signals delivered by memories connected to one of the digital-output registers;

said means (3) for multiplying by +1 or −1 comprising:

a fourth group of MOS transistors, connected in series by their collectors and emitters with said first group of MOS transistors, their gates being controlled by signals delivered by memories connected to one of said digital-output registers.

2. A correlator as defined in claim 1, in which: double-gate MOS transistors replace each MOS transistor in said first group in series with an MOS transistor in said fourth group.

3. A correlator as defined in claim 1, in which: said charge-transfer register (1) receiving said input signals (E) operates on single-phase current and comprises pairs of electrodes, alternate pairs of said electrodes receiving a clock signal, while in intermediate pairs, not receiving said clock signal, the storage electrode, which is the reading electrode, is connected to said means (7) for reading charges, and the transfer electrode is connected to a first reference voltage;

the second group of MOS transistors receive said clock signal at their gates;

said first group of MOS transistors receive at their gates a second reference voltage, and wherein reference voltages, clock signal amplitude and threshold voltage of said first group of MOS transistors are chosen such that said second group of transistors is blocked until charges arrive beneath said reading electrodes.

4. A correlator as defined in claim 1, in which said programmable digital-output registers (4, 5) comprise charge-transfer registers.

5. A correlator as defined in claim 1, in which said programmable digital-output registers (4, 5) comprise MOS transistors.

6. A correlator as defined in claim 1, in which each memory connected to one of said outputs of each of said programmable digital-output shift registers (4, 5) comprises:

a capacitor;

a first and a second inverter connected in series, the input of the first inverter being connected to one terminal of said capacitor, the other terminal of said capacitor being grounded, the output of said first and second inverters defining two additional memory outputs, the first inverter input possessing high impedance and the second inverter having low impedance, said second inverter output having two stable states, said two inverters in series having a response curve, said response curve having a gain in more than 1 in a transition zone between the two stable states;

an MOS transistor, connected by its collector and emitter between a reference voltage and said capacitor, and receiving at its gate a clock signal which makes it transmit during a first period, so as to have a functioning point situated in a first zone of the response curve of the two inverters where $VS/VE-1$ has a first sign, and which blocks this transistor outside this first period;

means for applying to the input of said two inverters, during a second period, an output of a programmable digital-output register, so that, depending on whether this output is 0 or 1, the functioning point is moved to a second zone of the response curve of the two inverters, or kept in the first zone;

an MOS transistor connected by its drain and source between the input and output of the two inverters in series, and receiving at its gate a control signal which makes said transistor conducting during a third period, the output from the two inverters being situated in the stable state of the response curve, corresponding to the second or first zone, depending upon whether the register output is 0 or 1.

7. A correlator as defined in claim 6, in which the capacitor is formed of the stray capacitance between the respective sources and drains of each of the two MOS transistors.

8. A correlator as defined in claim 6, in which the output and additional output of each memory controls the gates of two MOS transistors in said fourth group, forming part of the means (3) of multiplication by +1 or −1, and situated on two parallel reading tracks of the same reading electrode.

* * * * *